(12) United States Patent  (10) Patent No.: US 7,693,846 B2
Yachi  (45) Date of Patent: Apr. 6, 2010

(54) DATA MANAGEMENT SYSTEM AND METHOD FOR DATA SYNCHRONIZATION

(75) Inventor: Masayuki Yachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 367 days.

(21) Appl. No.: 10/865,607

(22) Filed: Jun. 10, 2004

(65) Prior Publication Data

US 2004/0254946 A1    Dec. 16, 2004

(30) Foreign Application Priority Data

Jun. 13, 2003    (JP)    ............................ P2003-170004

(51) Int. Cl.
 *G06F 17/00*    (2006.01)
(52) U.S. Cl. ........................................ 707/100; 707/10
(58) Field of Classification Search ........................ None
 See application file for complete search history.

(56) References Cited

U.S. PATENT DOCUMENTS

| | | | | |
|---|---|---|---|---|
| 5,893,116 | A * | 4/1999 | Simmonds et al. | 707/201 |
| 6,295,541 | B1 * | 9/2001 | Bodnar et al. | 707/203 |
| 6,678,705 | B1 * | 1/2004 | Berchtold et al. | 707/204 |
| 2002/0078072 | A1 * | 6/2002 | Tan et al. | 707/201 |
| 2002/0133507 | A1 * | 9/2002 | Holenstein et al. | 707/200 |
| 2003/0130984 | A1 * | 7/2003 | Quinlan et al. | 707/1 |
| 2003/0158852 | A1 * | 8/2003 | Zoltan | 707/100 |
| 2003/0172070 | A1 * | 9/2003 | Sawadsky et al. | 707/10 |
| 2003/0172074 | A1 * | 9/2003 | Highleyman et al. | 707/10 |
| 2004/0103098 | A1 * | 5/2004 | Mitra | 707/10 |
| 2004/0122693 | A1 * | 6/2004 | Hatscher et al. | 705/1 |
| 2004/0122853 | A1 * | 6/2004 | Moore | 707/103 R |
| 2004/0128624 | A1 * | 7/2004 | Arellano et al. | 715/530 |
| 2006/0064734 | A1 * | 3/2006 | Ma | 725/136 |

FOREIGN PATENT DOCUMENTS

| | | |
|---|---|---|
| JP | 10 63557 | 3/1998 |
| JP | 2002 268931 | 9/2002 |
| JP | 2002 300522 | 10/2002 |

* cited by examiner

*Primary Examiner*—Pierre M Vital
*Assistant Examiner*—Christopher J Raab
(74) *Attorney, Agent, or Firm*—Frommer Lawrence & Haug LLP; William S. Frommer; Thomas F. Presson (57) ABSTRACT

A data management system and method that collectively manages material data by synchronizing the material data stored in a material server with an OA server. The method includes sequentially storing material data including generated video/audio signals in at least a material server; determining that the material data stored in the material server has either a synchronous attribute or an asynchronous attribute with respect to at least an OA server which stores material data to be transmitted to a broadcast network. The method also includes synchronizing, between the material and OA servers, processing operations with respect to the same material data existing in both the material and OA servers and respectively having a synchronous attribute.

11 Claims, 4 Drawing Sheets

DATA MANAGEMENT SYSTEM AND METHOD FOR DATA SYNCHRONIZATION

BACKGROUND OF THE INVENTION

1. Field of the Invention

The present invention relates to a data management system, a data management method and a recording medium which manage input material data including video/audio signals by storing the material data in a server in the case where the material data is sent to, for example, a broadcast network.

This application claims priority of Japanese Patent Application No. 2003-170004, filed on Jun. 13, 2003, the entirety of which is incorporated by reference herein.

2. Description of the Related Art

Conventionally, a TV program to be broadcasted by broadcasting stations is supplied such that material data, which is audio/video signal, taken by TV video camera is once recorded for later reproduction on a non-linear accessible server, then additional material data for TV spot or the like is inserted into the material data to edit the resultant material data for TV broadcast, and the edited data is sent to a broadcast network. Such Recording and reproducing processes of material data for TV broadcast are performed through a data recording/reproduction apparatus as disclosed in, for example, Patent Document 1 (Jpn. Pat. Appln. Laid-Open Publication No. 2001-149410).

Figure 1:
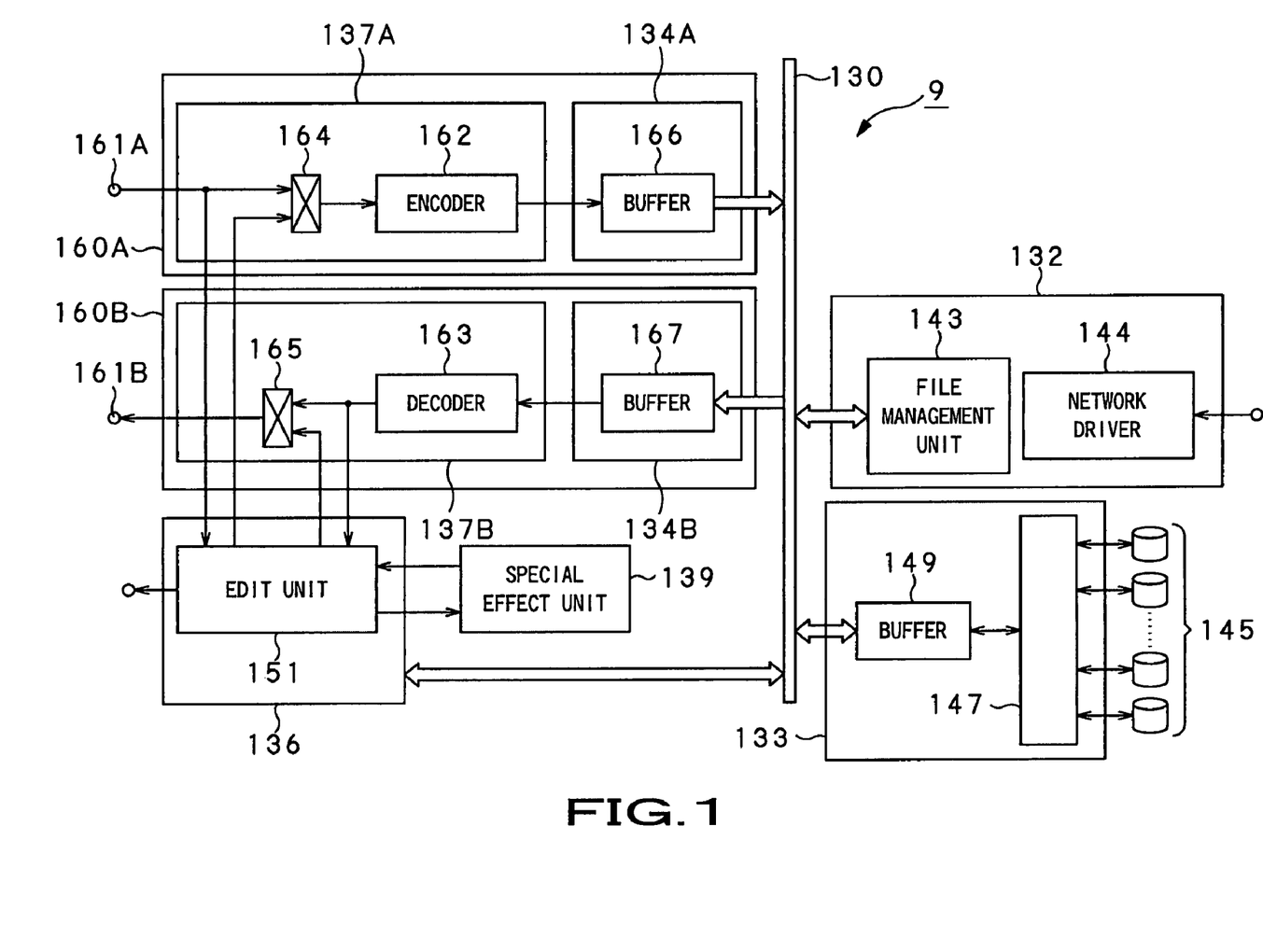
FIG. 1 is a block diagram showing the configuration of a conventional data recording/reproduction apparatus.

FIG. 1 shows a configuration of the data recording/reproduction apparatus in which the above recording and reproducing processes are performed. For a recording process of externally input material data in this data recording/reproduction apparatus 9, firstly, data input through a port 161A is compressed by an encoder 162, and the compressed data is then temporarily stored in a buffer memory 166. A data management unit 134A accesses a recording/reproduction unit 133 in the time slot period assigned thereto so as to transfer the data stored in the buffer memory 166 to the recording/reproduction unit 133 via an internal bus 130.

In the recording/reproduction unit 133, the transferred data is temporarily stored in a buffer memory 149 followed by being divided by a predetermined unit. The resultant data is finally stored in an HDD 145 with parity data being added to each of the divided data.

Next, for output of the data stored in the HDD 145 to outside of the apparatus, firstly, a data management unit 134B accesses the recording/reproduction unit 133 in the time slot period assigned thereto so as to make a request for data reproduction. Upon receiving the request, the recording/reproduction unit 133 allows a video disc controller 147 to read out the data and parity data stored in the HDD 145. The read out data and parity data are then subjected to error correction, and thus, the material data is reproduced. After being temporarily stored in a buffer memory 149, the reproduced material data is read out and transferred to the data management unit 134B via the internal bus 130.

The material data is then transferred via a buffer memory 167 in the data management unit 134B to a decoder 163 in a data input/output unit 137B for data expansion, followed by being transferred via a switch 165 to a port 161B, through which the material data is output to outside of the apparatus.

Further, for editing the material data for TV broadcast by inserting additional material data for TV spot or the like into the material data, an edit unit 151 extracts at least one of the data input from outside of the apparatus and the data reproduced by the recording/reproduction unit 133, to execute the editing operation. The edit unit 151 uses a matrix switcher, an audio mixer, or the like included therein, or utilize, as needed, functions of a special effect unit 139 to edit the extracted data. That is, according to the conventional data recording/reproduction apparatus, recording/reproduction function, input/output function and edit function can be realized by a single apparatus.

For the above conventional data recording/reproduction apparatus, a system has been proposed, in which recording/reproduction processing can be realized by means of two types of storages: a material server for recording generated material data in the first instance, and an ON-AIR server for storing material data to be reconstructed for on-air has been proposed.

In the above system, especially a system in which the same material data are recorded on both the material server and ON-AIR server (hereinafter, referred to as OA server) in order to handle the material data existing in the both servers as a single metadata item has been required. Further, another system has been required, in which only the material data existing in one of the material server and OA server can be deleted.

However, in order to record the same material data on the material server and OA server, a material data stored in the material server must be transferred to the OA server. Since the transfer rate in this operation is limited to a fixed rate or less, a great deal of time is required to transfer a large amount of material data to the OA server, failing to realize a smooth transfer operation.

Further, in the case of deleting the same data items stored in both the material server and OA server, moving them between folders, or renaming them, a user must carry out these operations for each server, so that the burden of the user is getting large.

Further, the above system is expected to realize functions of easily separating the material data that are to be transferred to the OA server from among the material data stored in the material server, and displaying, by a list, the data items in a hierarchical manner in order to improve convenience for the user that manages the system.

SUMMARY OF THE INVENTION

The present invention has been made to solve the above problems, and an object thereof is to provide a data management system and a data management method capable of synchronizing the material data stored in the material server with the OA server to collectively manage the synchronized material data.

To solve the above problems, the present inventors have invented a data management system, a data management method and a recording medium comprising functions of: sequentially storing material data including generated video/audio signals in one or more first server; determining that the material data stored in the first server has either a synchronous attribute or an asynchronous attribute with respect to one or more second server which stores material data to be transmitted to a broadcast network; and synchronizing, between the first and second servers, processing operations with respect to the same material data existing in both the first and second servers and respectively having a synchronous attribute.

That is, a data management system according to the present invention comprises: at least a first server which sequentially stores material data including generated video/audio signals; at least a second server which stores material data to be transmitted; and an electronic device having an attribute determination means for determining that the material data stored in the first server has either a synchronous attribute or an asynchronous attribute with respect to the second server, and a synchronization means for synchronizing processing operations with respect to the same material data existing in both the first and second servers and respectively having a synchronous attribute.

A data management method according to the present invention comprises: sequentially storing material data including generated video/audio signals in at least a first server; determining that the material data stored in the first server has either a synchronous attribute or an asynchronous attribute with respect to the second server which stores material data to be transmitted; and synchronizing, between the first and second servers, processing operations with respect to the same material data existing in both the first and second servers and respectively having a synchronous attribute.

Further, a recording medium according to the present invention records a program for: sequentially storing material data including generated video/audio signals in at least a first server; determining that the material data stored in the first server has either a synchronous attribute or an asynchronous attribute with respect to at least a second server which stores material data to be transmitted; and synchronizing, between the first and second servers, processing operations with respect to the same material data existing in both the first and second servers and respectively having a synchronous attribute.

As described above, the data management system, data management method and recording medium to which the present invention is applied comprises functions of: sequentially storing material data including generated video/audio signals in one or more first server; determining that the material data stored in the first server has either a synchronous attribute or an asynchronous attribute with respect to one or more second server which stores material data to be transmitted; and synchronizing the material data having a synchronous attribute with the second server.

As a result, it is possible to collectively manage the material data stored in both the first and second servers as a single metadata item, and to rapidly record the material data that has already been stored in the first server onto the second server.

DETAILED DESCRIPTION OF THE PREFERRED EMBODIMENTS

An embodiment of the present invention will be described below in detail with reference to the accompanying drawings.

Figure 2:
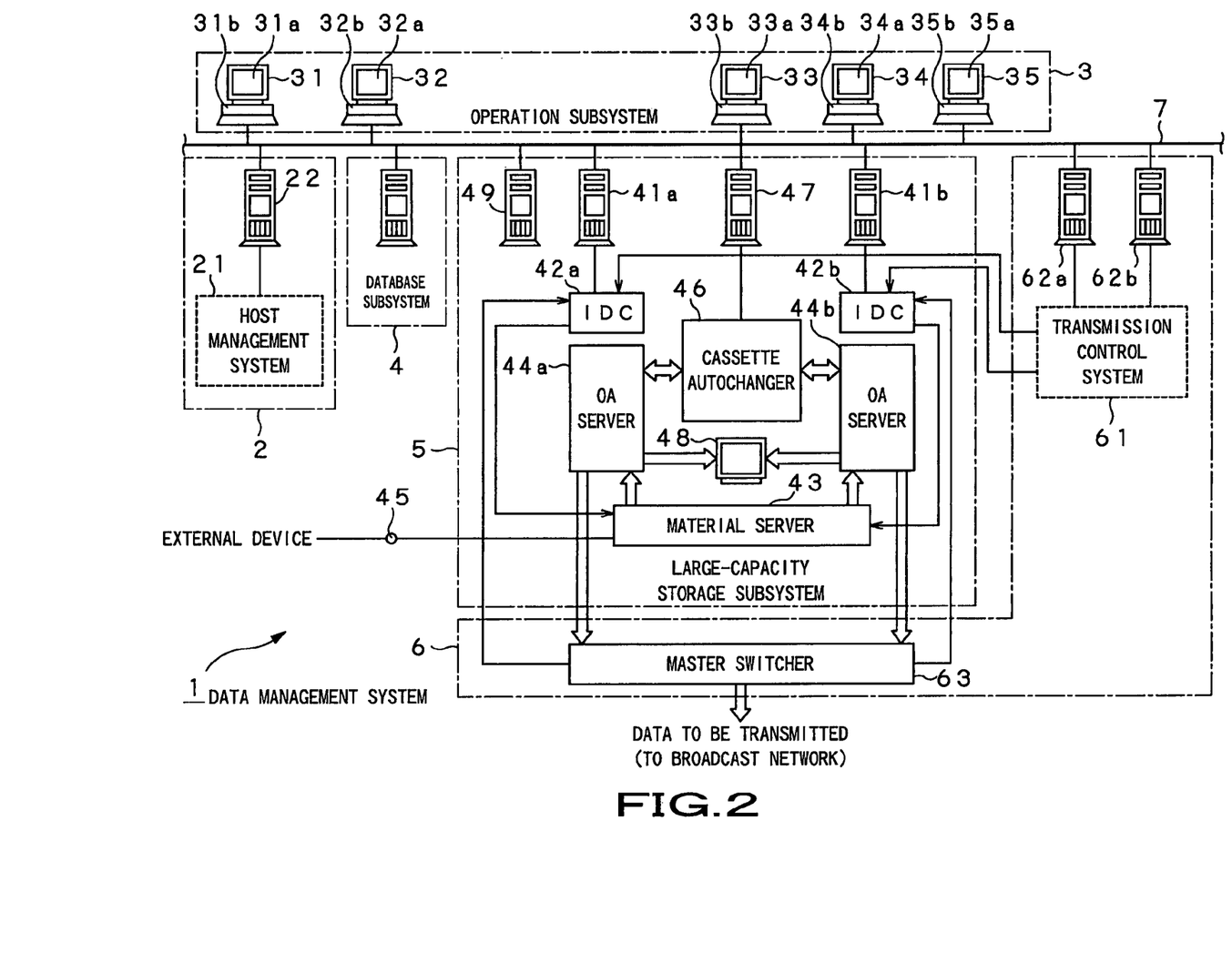
FIG. 2 is a block diagram showing the configuration of the data management system to which the present invention is applied.

The present invention is applied to a data management system for managing material data including video/audio signals. The data management system 1 is mainly installed in a broadcasting station or the like. As shown in FIG. 2, for example, the data management system 1 comprises a local host subsystem 2, an operation subsystem 3, a database subsystem 4, a large capacity storage subsystem 5, and a transmission subsystem 6.

The local host subsystem 2 includes a host management system 21 installed, for example, in a program production department or the like and a data gateway 22 connected to the host management system 21. The host management system 21 is configured to transmit a TV program schedule created by the program production department or the like. The data gateway 22 is constituted by a network-enabled personal computer (PC) or the like. For example, two network cards are inserted into slots of the data gateway 22 with one card connected to the host management system 21 and the other connected to a LAN 7 included in the data management system 1, and thereby the data gateway 22 selectively transmits the necessary data to the two networks.

The operation subsystem 3 includes a plurality of terminal devices 31 to 35. Each of the terminal devices 31 to 35 is constituted by a PC or the like operated by a user, and has an application installed therein for managing each material data. A plurality of processing operations such as recording, editing, transmission monitoring, system management may appropriately be allotted to the terminal devices 31 to 35. Alternatively, the above processing operations may be realized by one terminal device.

GUIs (Graphical User Interface) 31a to 35a are implemented in each of the terminal devices 31 to 35. Further, the terminal devices 31 to 35 are respectively provided with operation units 31b to 35b each including a mouse or a keyboard for the user to operate the terminal devices 31 to 35.

The database subsystem 4 is equipped with a network-enabled database engine typified by, for example, an SQL (Structured Query Language) database engine. Further, the database sub system 4 includes a database table with which reference, update, and addition of the recorded data can freely be carried out through the operation units 31b to 35b provided in each of the terminal devices 31 to 35. The database table also manages schedule data transmitted from the host management system 21, data of a system set value set in each of the terminal devices 31 to 35, or the like.

The large-capacity storage subsystem 5 is constituted by two types of storages: a material server for recording generated material data in the first instance, and an OA server for storing material data to be reconstructed for on-air. The large-capacity storage subsystem 5 includes an SMS (Server Management System) 41, an IDC (Intelligent Device Controller) 42, a material server 43, an OA server 44, a cassette autochanger 46, an autochanger control unit 47, a monitor unit 48, and a command relay unit 49.

The SMSs 41a and 41b control various resource allocations with respect to I/O ports and the like of the OA servers 44a and 44b in response to control commands transmitted via the LAN 7 from the operation subsystem 3, and transmit the control commands to the IDC 42.

The IDCs 42a and 42b real-time control the material server 43 and OA servers 44a and 44b in response to the control commands transmitted from the SMSs 41a and 41b.

The material server 43 is constituted by a storage (hereinafter, referred to as source storage for synchronization) that can store the high-resolution material data, and stores the material data transmitted via a port 45 connected thereto from an external device. The material server 43 may store the material data reproduced from a magnetic tape of the cassette autochanger 46 to be described later.

The OA servers 44a and 44b are constituted by two storages (hereinafter, referred to as destination storages for synchronization a and b) that can store high-resolution material data, and transmit the material data for on-air stored therein to the transmission subsystem 6 under the control of the IDCs 42a and 42b.

The cassette autochanger 46 records the material data stored in the OA servers 44a and 44b onto the magnetic tape. The autochanger control unit 47 controls various resource allocations with respect to the cassette autochanger 46 under the control of the operation subsystem 3. The monitor unit 48 previews the material data read out from the OA servers 44a and 44b according to an instruction issued by the operation subsystem 3.

The command relay unit 49 serves as so-called a command interface between the operation subsystem 3 and large-capacity storage subsystem 5. The command relay unit 49 may be constituted by, for example, two devices called "Server Management terminal" and "EZMAX terminal". For simplification of the system, the functions of the command relay unit 49 may be carried out, in a shared manner, by the operation subsystem 3 and large-capacity storage subsystem 5.

The transmission subsystem 6 includes a transmission control system 61, a transmission control gateways 62a and 62b connected to the transmission control system 61, and a master switcher 63.

The transmission control system 61 outputs notification data based on a stand-by command, stand-by status data or the like to the transmission control gateways 62a and 62b. Further, the transmission control system 61 transmits a signal for reproduction to the IDCs 42a and 42b in the case of reproducing the material data stored in the OA servers 44a and 44b. The transmission control gateways 62a and 62b update a table data in the database subsystem 4. The master switcher 63 notifies, at a time when programs can be on-air, the IDCs 42a and 42b of a corresponding signal. Upon receiving the above signal and signal for reproduction, the IDCs 42a and 42b control the OA servers 44a and 44b to transmit the stored material data to the master switcher 63. The material data transmitted to the master switcher 63 is directly sent to a broadcast network.

In the data management system 1 having the above configuration, the material data transmitted from an external device is firstly stored in the material server 43. Thereafter, desired material data is synchronized with the OA servers 44a and 44b under the control from the operation subsystem 3. As a result, the same effect as in the case where the material data stored in the material server 43 is transferred to the OA servers 44a and 44b can be obtained. In response to the instruction for reproduction issued via the IDCs 42a and 42b, the OA server 44a and 44b transmit the material data stored therein via the master switcher 63 to an external broadcast network.

The term synchronization here denotes that processing operations with respect to the same data items stored in both the material server 43 and OA server 44 are allowed to correspond to each other. For example, when a processing operation for generating a new data item in the material server 43 is performed, the same processing operation is accordingly performed in the OA server. Further, in the case of changing a name of the file (hereinafter, referred to as synchronized file) organizing synchronized material data, by just changing a name of the synchronized file stored in the material server 43, a name of the file organizing the same material data stored in the OA server can accordingly be changed.

Figure 3:
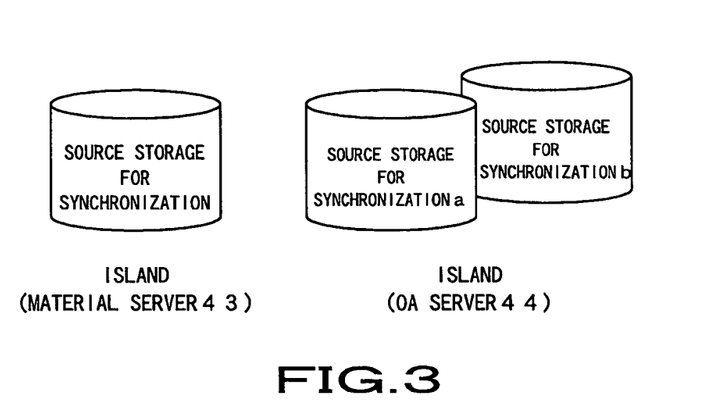
FIG. 3 is a view for explaining islands and storages constituting the islands.

In the data management system 1, each of the servers 43 and 44 which store the material data to be managed can be defined as logical aggregate called island. One island includes one or two storages as shown in FIG. 3. In the island including two storages shown in the right side of FIG. 3, which has been devised to prevent on-air accidents, the material data stored in the two storages constituting the island can entirely be synchronized. In the aforementioned example of FIG. 2, two islands, i.e., the material server 43 and OA server 44 are defined. The material data stored in both the two destination storages for synchronization a and b constituting the OA server 44 are entirely synchronized.

In addition to the aforementioned material data, each of these servers 43 and 44 can store folders for containing files each organizing material data. The user can create a folder in the material server 43 through each of the operation units 31b to 35b to perform various processing operations with respect to the folder, such as renaming, moving, or deleting.

It is possible to determine that the material data or folder stored in the material server 43 has either a synchronous attribute (to be synchronized between islands) or asynchronous attribute (not to be synchronized between islands). In the case where either of the attributes is given to a top folder located directly below the island, all the folders or material data created under the top folder succeed the given attribute of the top folder.

Figure 4:
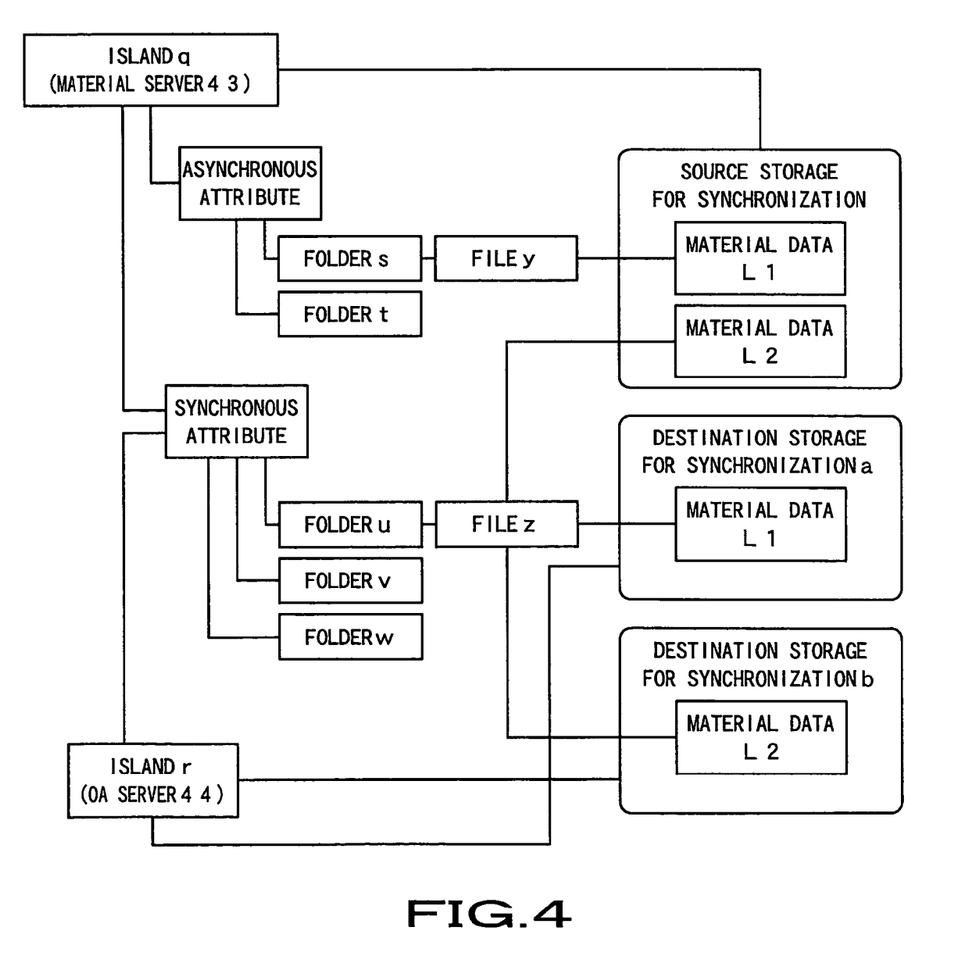
FIG. 4 is a block diagram showing a data structure in the case where folders each having a synchronous attribute and folders each having an asynchronous attribute exist.

FIG. 4 shows a data structure in a state where folders each having a synchronous attribute and folders each having an asynchronous attribute exist. An island q shown in FIG. 4 corresponds to the material server 43 having the source storage for synchronization, and an island r corresponds to the OA server 44 having the destination storages a and b for synchronization. Of the five folders s to w existing in the material server 43, folders u to w respectively have a synchronous attribute, and folders s and t respectively have an asynchronous attribute.

The synchronous folders u to w link to both islands q and r, whereas the asynchronous folders only link to the island q positioned immediately above the asynchronous folders.

The asynchronous folder s contains a file y organizing material data L1. On the other hand, the synchronous folder u contains a file z organizing material data L2. Since the material data positioned under the folders have the same attributes as their parent folder, the material data L2 contained in the synchronous folder u is recorded on all the storages that link to the islands q and r, whereas the material data L1 contained in the asynchronous folder s is recorded only on the source storage for synchronization that links to the island q.

The user easily determines to give either a synchronous attribute or an asynchronous attribute to each material data by a drag and drop operation through each of the operation units 31b to 35b of the terminal devices 31 to 35. More specifically, the above operation can be completed by placing the file organizing the material data in either of the synchronous folder or asynchronous folder.

That is, in the data management system 1 to which the present invention is applied, the material data having a synchronous attribute in the material server 43 can be synchronized on the OA server belonging to the different island. As a result, it is possible to handle the material data existing in both the material server 43 and OA server 44 as a single metadata item. Further, it is possible to rapidly record the same material data on each server without transferring the material data that has been stored in the material server 43 to the OA server 44.

In the case of transferring the material data that has been stored in the material server 43 to the OA server 44, a communication cable that links between the above two servers needs to be connected to each I/O port of the servers 43 and 44. On the other hand, in the data management system 1, material data can be synchronized between the servers 43 and 44 as described above, so that the number of the I/O ports used can be reduced, thereby enhancing efficiency of the entire system. Since I/O ports of the OA server 44 are mainly connected to cables for linking to a broadcast network during on-air time, assignment of the communication cable for linking to the material server 43 to the I/O port is limited. Thus, also in this regard, the present invention in which the number of I/O ports can be reduced as described above is advantageous.

Further, in the data management system 1, even in the case where all the I/O ports of the OA server 44 are assigned to link connections to the broadcast network, various processing operations with respect to the material data or the like on the material server 43 can be synchronized to the material data on the OA server 44 by later establishment of a connection between the material server 43 and OA server 44.

Further, in the data management system 1 according to the present invention, a so-called tree structure in which the aforementioned material data or folders are hierarchized, may be displayed on each of the GUIs 31*a* to 35*a* of the terminal devices 31 to 35.

Figure 5A:
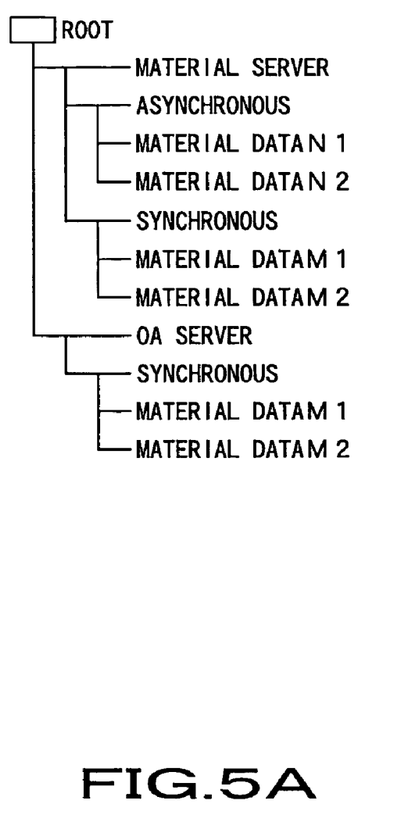
FIG. 5 is a view showing an example of a tree structure displayed on GUI.

FIG. 5 shows an example of the tree structure displayed on each of the GUIs 31*a* to 35*a*. Immediately under a root directly shown in FIG. 5A, "material server" and "OA server" are located. Further, immediately under the "material server", "asynchronous folder" and "synchronous folder" are located. This "synchronous folder" denotes a folder having a synchronous attribute, and "asynchronous folder" denotes a folder having an asynchronous attribute. Further, immediately under "OA server", "synchronous folder" is located.

Both "synchronous folder" on "material server" side and "synchronous folder" on "OA server" side contain material data M1 and M2. Further, "asynchronous folder" contains material data N1 and N2.

That is, in the example of GUIs 31*a* to 35*a*, the material data or folders stored in each of the servers 43 and 44 can be displayed, by a list, on a screen in such a manner that the material data or folders are classified into whether they have a synchronous attribute or an asynchronous attribute. As a result, the user can easily grasp the attribute of the material data stored in each of the servers 43 and 44 by viewing the screen on each of the GUIs 31*a* to 35*a*, enhancing convenience for the user that manages the entire system. Further, the user can perform a drag and drop operation with respect to the desired material data through each of the operation units 31*b* to 35*b* while viewing the tree structure displayed on each of the GUIs 31*a* to 35*a*, thereby reducing burden of the user.

Figure 5B:
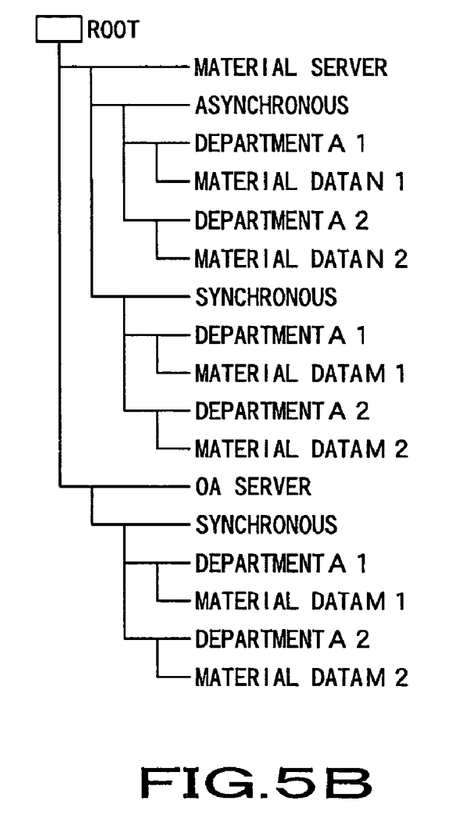

Further, as shown in FIG. 5B, in the tree structure displayed on each of the GUIs 31*a* to 35*a*, folders "department A1" "department A2", ... may be created immediately under each of "synchronous folder" and "asynchronous folder". In the case where the management system 1 of the present invention is shared by a plurality of departments, when a new folder is provided for each department in a hierarchical manner, convenience for the user can further be enhanced.

Further, in the case of preventing the material data from being read by other department's user for certain reasons, access restriction for other department's user may be provided to the folder hierarchized for each department. In the access restriction, when the user belonging to the department other than A1 clicks on a folder "department A1", a message saying that access is denied may be displayed on each of the GUIs 31*a* to 35*a* with the material data existing in the folder "department A1" not being displayed on each of the GUIs 31*a* to 35*a*. Alternatively, another control may be performed so that the folder "department A1" is not displayed in each of the GUIs 31*a* to 35*a* of the terminal devices 31 to 35 installed in the departments other than A1.

The user can also rename these folders or material data using each of the operation units 31*b* to 35*b*. In this case, for example, on each of the GUIs 31*a* to 35*a* of FIG. 5A, the user clicks on the folder or material data existing in "synchronous folder" located immediately under "material server" to rename the folder or the like. In conjunction with the above operation, a name of the same folder or the like existing in "synchronous folder" located immediately under "OA server" is changed. That is, by changing a name of the folder or the like in the material server 43 serving as a source storage for synchronization, a name of the folder or the like that is synchronized with the renamed folder or the like and links another island can be quickly changed.

Further, the user can delete folders or material data using each of the operation units 31*b* to 35*b*. In this case, for example, on each of the GUIs 31*a* to 35*a* of FIG. 5A, the user clicks on the folder or material data existing in "synchronous folder" located immediately under "material server" to delete the folder or the like. In conjunction with the above operation, the same folder or the like existing in "synchronous folder" located immediately under "OA server" is deleted. That is, by deleting the folder or the like in the material server 43 serving as a source storage for synchronization, the folder or the like that is synchronized with the deleted folder or the like and links another island can be quickly deleted.

Further, the user can move the aforementioned folders or material data to the location immediately under another folder using each of the operation units 31*b* to 35*b*. In this case, for example, on each of the GUIs 31*a* to 35*a* of FIG. 5A, the user clicks on the folder or material data existing in "synchronous folder" located immediately under "material server" to move the folder or the like to the location immediately under another folder. In conjunction with the above operation, the same folder or the like existing in "synchronous folder" located immediately under "OA server" is moved to the location immediately under the another folder. That is, by moving the folder or the like in the material server 43 serving as a source storage for synchronization, the folder or the like that is synchronized with the moved folder or the like and links another island can be quickly moved.

As described above, in the data management system 1 to which the present invention is applied, the user uses each of the operation units 31*b* to 35*b* to specify a necessary processing operation with respect to the material data recorded on the material server 43. When the processing operation is specified on the material server 43 side with respect to the material data having a synchronous attribute, the processing operation is performed with respect to each of the material data synchronized between the material server 43 and OA server 44.

Therefore, in the case of, for example, deleting the material data synchronized between the material server 43 and OA server 44, moving the above material data between folders, and/or changing a name of the folder synchronized between the material server 43 and OA server 44, the user need not perform the above processing operations for each server, leading to a reduction of labor.

The present invention is not limited to the aforementioned embodiment. In the above data management system 1, one material server 43 and two OA servers 44 are employed. However, any number of servers may be employed as long as the number of both the material server 43 and OA server 44 is one or more. In this case, when each of the servers 43 and 44 is increased, these servers are daisy-chained in a longitudinal or lateral direction of FIG. 2.

Further, in the present invention, the user determines that material data or folder has a synchronous attribute or asynchronous attribute by operating each of the operation units 31*b* to 35*b*. However, the present invention is not limited to this. Each of the terminal devices 31 to 35 may automatically determine the attributes of the material data or folders. Further, it is possible to previously determine the attributes of the material data or folders before shipment of the application to be installed in the terminal devices. Moreover, it is possible for the system to allow only certain users to set the attributes.

Further, the application of the present invention is not limited to aforementioned data management system 1. It is needless to say that the present invention may be applied to, for example, an application program for allowing the terminal devices 31 to 35 to execute the operations described above, or recording medium such as a magnetic recording medium, optical recording medium, or semiconductor recording medium that the program has been recorded onto.

What is claimed is:

1. A data management system for managing material data of programs, the data management system comprising:
    schedule transmitting means for transmitting a TV program schedule;
    at least a first server which sequentially stores material data including generated video/audio signals;
    at least a second server which stores material data to be transmitted;
    an electronic device having:
        attribute determination means for determining that the material data stored in the first server has either a synchronous attribute or an asynchronous attribute with respect to the second server, and
        synchronization means for synchronizing processing operations with respect to the same material data that exist in both the first and second servers, and that have a synchronous attribute respectively; and
    a database subsystem for managing a database table for the material data and the TV program schedule with a network-enabled database engine,
    wherein the material data stored in the first server and the second server is displayed on a screen to a plurality of user terminals in either a synchronous folder or an asynchronous folder,
    wherein said first server and said second server have a tree structure with at least folders for synchronous transfer and asynchronous transfer,
    wherein the tree structure is configured so that asynchronous folders contain a file organizing material data that is recorded only on storage sources that link to an island that is positioned immediately above the asynchronous folders,
    wherein the tree structure is configured so that synchronous folders contain a file organizing material data that is recorded on all storage sources that link to islands that are attached to the synchronous folders,
    wherein department folders that have access restriction are created immediately under each of asynchronous folder and synchronous folder, and
    wherein a department folder belonging to a first department is only displayed in a GUI of a terminal device associated with the first department.

2. The data management system according to claim 1, wherein the attribute determination means determines that each of folders for containing files each of which organizes the material data has a synchronous attribute or an asynchronous attribute, and the synchronization means synchronizes the material data to be contained in the folder having a synchronous attribute with the second server.

3. The data management system according to claim 1, wherein the electronic device further includes operation designation means for designating a processing operation to be executed with respect to the material data stored in the first server, and when the processing operation is designated with respect to the material data having a synchronous attribute, the synchronization means executes the processing operation with respect to the material data that has been synchronized with the second server.

4. A data management method for managing material data of programs, the data management method comprising the steps of:
    transmitting a TV program schedule;
    sequentially storing material data including generated video/audio signals in at least a first server;
    determining that the material data stored in the first server has either a synchronous attribute or an asynchronous attribute with respect to at least a second server which stores material data to be transmitted;
    synchronizing, between the first and second servers, processing operations with respect to the same material data existing in both the first and second servers and respectively having a synchronous attribute,
    wherein said first sever and said second server have a tree structure with at least folders for synchronous transfer and asynchronous transfer,
    configuring the tree structure so that asynchronous folders contain a file organizing material data that is recorded only on storage sources that link to an island that is positioned immediately above the asynchronous folders;
    configuring the tree structure so that synchronous folders contain a file organizing material data that is recorded on all storage sources that link to islands that are attached to the synchronous folders;
    creating department folders, that have access restriction, immediately under each of asynchronous folder and synchronous folder, and
    managing a database table for the material data and the TV program schedule with a network-enabled database engine,
    wherein the material data stored in the first server and the second server is displayed on a screen to a plurality of user terminals in either a synchronous folder or an asynchronous folder, and
    wherein a department folder belonging to a first department is only displayed in a GUI of a terminal device associated with the first department.

5. A computer-readable recording medium storing an executable program, which, when executed, causes a processor to process material data of programs, the process comprising the steps of:
    transmitting a TV program schedule;
    sequentially storing material data including generated video/audio signals in at least a first server;
    determining that the material data stored in the first server has either a synchronous attribute or an asynchronous attribute with respect to at least a second server which stores material data to be transmitted;
    synchronizing, between the first and second servers, processing operations with respect to the same material data existing in both the first and second servers and respectively having a synchronous attribute,
    wherein said first sever and said second server have a tree structure with at least folders for synchronous transfer and asynchronous transfer,
    configuring the tree structure so that asynchronous folders contain a file organizing material data that is recorded only on storage sources that link to an island that is positioned immediately above the asynchronous folders;

configuring the tree structure so that synchronous folders contain a file organizing material data that is recorded on all storage sources that link to islands that are attached to the synchronous folders;

creating department folders, that have access restriction, immediately under each of asynchronous folder and synchronous folder, and managing a database table for the material data and the TV program schedule with a network-enabled database engine, wherein the material data stored in the first server and the second server is displayed on a screen to a plurality of user terminals in either a synchronous folder or an asynchronous folder, and wherein a department folder belonging to a first department is only displayed in a GUI of a terminal device associated with the first department.

6. The data management system according to claim 1, wherein the programs include audio and video signals.

7. The data management system according to claim 1, wherein the programs are sent to a broadcast network.

8. The data management method according to claim 4, wherein the programs include audio and video signals.

9. The data management method according to claim 4, wherein the programs are sent to a broadcast network.

10. The computer-readable recording medium according to claim 5, wherein the programs include audio and video signals.

11. The computer-readable recording medium according to claim 5, wherein the programs are sent to a broadcast network.

* * * * *